United States Patent
Lossin et al.

(10) Patent No.: US 8,850,258 B2
(45) Date of Patent: Sep. 30, 2014

(54) CALIBRATION FOR SOURCE-SYNCHRONOUS HIGH FREQUENCY BUS SYNCHRONIZATION SCHEMES

(75) Inventors: Yoav Lossin, Jerusalem (IL); Aviad Wertheimer, Tsur Hadassah (IL)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 13/528,704

(22) Filed: Jun. 20, 2012

(65) Prior Publication Data

US 2013/0346785 A1     Dec. 26, 2013

(51) Int. Cl.
*G06F 1/12* (2006.01)

(52) U.S. Cl.
USPC ............................ 713/401; 713/400; 713/600

(58) Field of Classification Search
USPC .................. 713/400, 401, 500, 600
See application file for complete search history.

(56) References Cited

U.S. PATENT DOCUMENTS

| | | | |
|---|---|---|---|
| 5,371,880 A * | 12/1994 | Bhattacharya ................ | 713/400 |
| 6,664,833 B1 * | 12/2003 | Fischer ........................ | 327/170 |
| 6,934,867 B2 * | 8/2005 | Chen et al. .................... | 713/401 |
| 6,943,610 B2 * | 9/2005 | Saint-Laurent ............... | 327/295 |
| 7,139,937 B1 * | 11/2006 | Kilbourne et al. ........... | 714/47.2 |
| 7,254,657 B1 * | 8/2007 | Lanfield et al. .............. | 710/105 |
| 7,551,646 B1 * | 6/2009 | Zhang et al. .................. | 370/503 |
| 8,497,704 B2 * | 7/2013 | Singh et al. ................... | 326/41 |
| 8,683,253 B2 * | 3/2014 | Gaskins et al. ............... | 713/401 |
| 2002/0116656 A1 * | 8/2002 | Lee et al. ...................... | 713/500 |
| 2008/0303570 A1 * | 12/2008 | Lee ................................ | 327/161 |
| 2012/0084575 A1 * | 4/2012 | Flores et al. .................. | 713/300 |

\* cited by examiner

*Primary Examiner* — Chun Cao
(74) *Attorney, Agent, or Firm* — Schwabe, Williamson & Wyatt, P.C.

(57) ABSTRACT

Embodiments provide bus synchronization system including a source module, a plurality of destination modules, and a data alignment controller. The source module is configured to synchronize a plurality of data segments of a data bus with a source clock signal, and transmit respective synchronized data segments to individual destination modules. The source module is further configured to transmit the source clock signal to the destination modules contemporaneously with the synchronized data segments. The source module thereafter receives feedback clock signals from the individual destination modules, the feedback clock signals being delayed versions of the source clock signal. The data alignment controller adjusts an output delay time for the individual destination modules, based on the received feedback clock signals, to temporally align output signals of the destination modules.

26 Claims, 3 Drawing Sheets

CALIBRATION FOR SOURCE-SYNCHRONOUS HIGH FREQUENCY BUS SYNCHRONIZATION SCHEMES

TECHNICAL FIELD

Embodiments of the present disclosure relate generally to electronic circuits and more specifically to source-synchronous high frequency bus synchronization.

BACKGROUND

Routing data buses over long wires, such as on a computer chip, may result in differences in propagation delay between segments of the data bus. Commonly, if the propagation delay over the bus exceeds the clock cycle time, one or more corrective measures must be employed, such as clock manipulation at both the source and destinations of the data (e.g., using an early clock at the source and a late clock at the destination), intermediate sampling (e.g., pipelining) of the data along the path, and/or using a wider data bus at a lower clock frequency. These corrective measures add complexity to the design and/or clocking scheme, reduce performance quality, and/or increase routing congestion. Furthermore, propagation delay does not scale with process technology shrinking.

BRIEF DESCRIPTION OF THE DRAWINGS

Embodiments of the present disclosure will be described by way of example embodiments, but not limitations, illustrated in the accompanying drawings in which like references denote similar elements, and in which.

DETAILED DESCRIPTION

Figure 1:
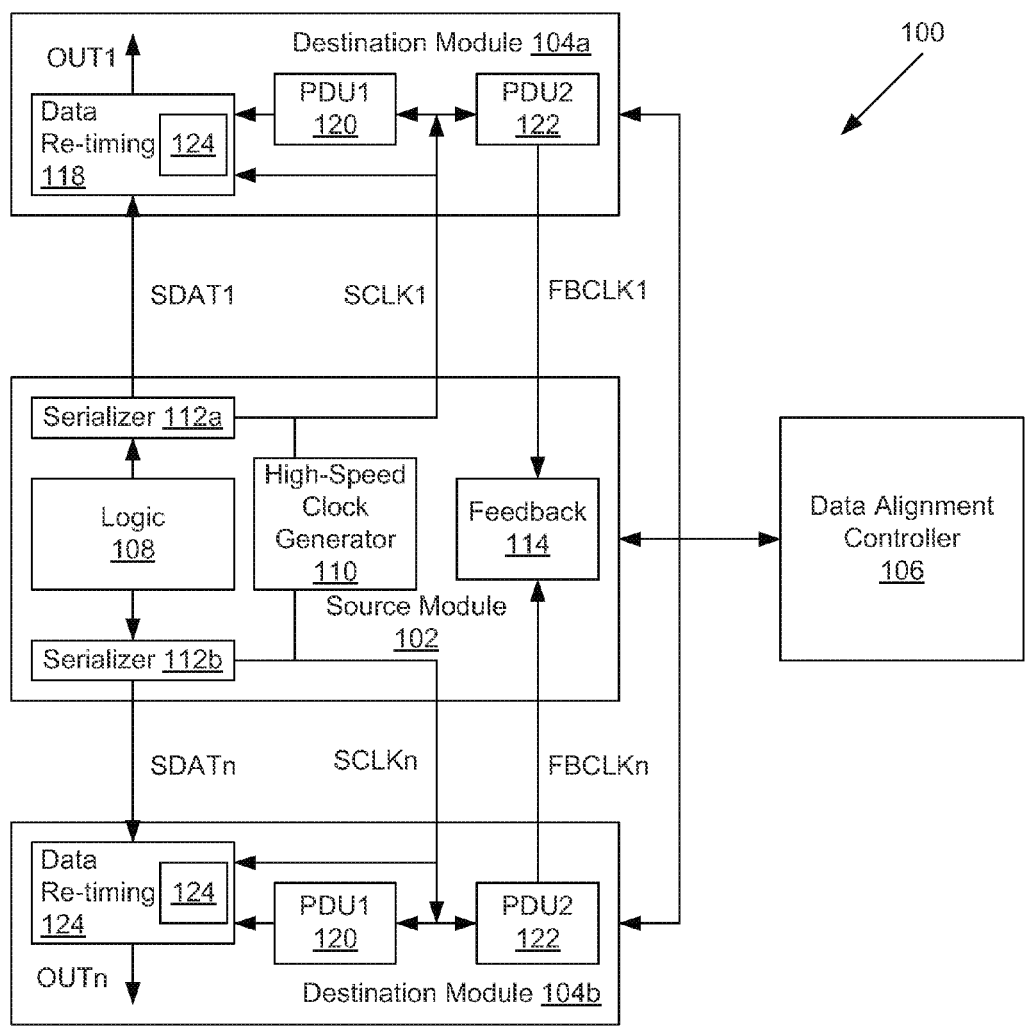
FIG. 1 illustrates a block diagram of a source-synchronous high frequency bus synchronization system in accordance with various embodiments.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various embodiments may provide a source-synchronous high frequency bus synchronization system. The system may include a source module that serializes and synchronizes a wide data bus having a plurality of wide data segments into a plurality of narrow data buses having a plurality of narrow high-speed data segments synchronized with a high-speed source clock signal. The high-speed data segments may be driven to respective destination modules. The source clock signal may be driven to the destination modules contemporaneously with the high-speed data segments. The destination modules use the received source clock signal to sample (e.g., latch) the high-speed data segment and may pass the high-speed data segment as an output signal. A data alignment controller may determine output delay times for the individual destination modules and program the destination modules to delay the output signal by the respective output delay time. Accordingly, the output signals at the plurality of destination modules may be temporally aligned with one another.

FIG. 1 illustrates a bus synchronization system 100 in accordance with various embodiments. System 100 may include a source module 102, a plurality of destination modules 104a-b, and a data alignment controller 106. The source module 102 may also be referred to as a bus controller, and the destination modules 104a-b may also be referred to as input/output segment (IOS) units. Although only two destination modules 104a-b are shown in FIG. 1, embodiments of system 100 may include any suitable number of destination modules 104a-b. Accordingly, destination module 104a is labeled as the first destination module and destination module 104b is labeled as the nth destination module.

In various embodiments, the source module 102 may include logic 108 that generates a wide data bus. The wide data bus may include a plurality of wide data segments that are to be sent to different destination modules 104a-b. In some embodiments, the logic 108 may operate with a slow-speed clock signal.

The source module 102 may further include a high-speed clock generator 110. The high-speed clock generator 110 may produce a high-speed clock signal that has a higher frequency than the slow-speed clock signal. For example, the high-speed clock frequency may be an integer multiple of the slow-speed clock frequency, such as two or four times faster than the slow-speed clock frequency. In various embodiments, the high-speed clock signal may also be referred to as the source clock signal (e.g., source-synchronous clock signal).

The source module 102 may further include a plurality of serializers 112a-b. The serializers 112a-b may serialize the wide data bus into a plurality of narrow data buses. The narrow data buses may have a plurality of narrow data segments. The narrow data segments may have fewer bits than the wide data segments. For example, each serializer 112a-b may receive a wide data segment that is to be sent to the corresponding destination module 104a. The serializer 112a-b may split the wide data segment into a plurality of narrow data segments, such as two or four data segments. The narrow data segments may have fewer bits than the wide data segment according to the serialization factor used. For example, if the wide data segment is split into two narrow data segments, the narrow data segments may have one-half the number of bits of the wide data segment.

Additionally, the serializer 112a-b may synchronize the narrow data segments with the source clock signal. In various embodiments, the serialization factor used may be equal to the multiplication factor of the high-speed source clock frequency compared with the slow-speed clock frequency.

In other embodiments, the logic 108 may operate at the same frequency as the source clock signal. In these embodiments, the serializers 112a-b may not be included or may synchronize the data segments with the source clock signal without serializing the data segments.

In various embodiments, the source module 102 may transmit the serialized and synchronized data segments (also referred to as high-speed data segments and/or source data segments (SDAT)) to the respective destination modules 104a-b. The source module 102 may also send the source clock signal (SCLK) to the destination modules 104a-b contemporaneously with the source data segments.

In some embodiments, the source data segments and source clock signals may be driven to the respective destination modules 104a-b over relatively long wires, and may therefore exhibit significant propagation delay. The relative propagation delay time difference between when the destination module 104a-b receives the high-speed data segment and the high-speed clock signal may be kept below a threshold, such as less than one clock cycle time of the high-speed clock and/or less than half of the clock cycle time.

In various embodiments, the destination modules 104a-b may send the received source clock signal (e.g., SCLK1, SCLKn) back to the source module 102 as a feedback clock signal (e.g., FBCLK1, FBCLKn). The feedback clock signal may be a delayed version of the source clock signal. The source module 102 may include a feedback module 114 that receives the feedback clock signals from the plurality of destination modules 104a-b. The feedback module 114 may detect a timing order of the received feedback clock signals. The data alignment controller 106 may use the feedback module to determine an output delay time for the individual destination modules 104a-b to re-align the high-speed data segments at the destination modules 104a-b (e.g., by a data re-timing block 118, discussed further below).

Although the source clock signals and feedback clock signals are shown in FIG. 1 as being the high-speed clock, in other embodiments, different calibration signals (e.g., source signals and feedback signals) may be used to calibrate the output delay times of the destination modules 104a-b besides the high-speed clock signal. For example, a control signal may be used for the source signals and feedback signals to calibrate the output delay times of the destination modules 104a-b.

For example, as shown in FIG. 1, the destination modules 104a-b may include a first programmable delay unit 120 (PDU1 120) and a second programmable delay unit 122 (PDU2 122, also referred to as feedback PDU 122). In some embodiments, the PDU1 120 and/or PDU2 122 may be delay-locked loops (DLLs). In other embodiments, the PDU1 120 and/or PDU2 122 may include any other suitable programmable devices and/or structures for delaying a signal. PDU2 122 may receive the source clock signal and pass the feedback clock signal to the feedback module 114 with an added feedback delay time. In various embodiments, the feedback delay time may be initially set to zero. The data alignment controller 106 may initialize the PDU2 to provide a zero feedback delay time at the beginning of an alignment calibration process.

In some embodiments, the feedback module 114 may detect which feedback clock signal is received first. The data alignment controller 106 may increase the feedback delay time of the corresponding PDU2 122 to compensate. The data alignment controller 106 may repeat this procedure until all of the feedback clock signals are received by the feedback module 114 at substantially the same time.

The propagation delay between the high-speed clock generator 110 and the PDU2 122 may be substantially equal to the propagation delay between the PDU2 122 and the feedback module 114. Additionally, the propagation delay between the high-speed clock generator 110 and the PDU2 122 may be substantially equal to the propagation delay of the high-speed data segment from the serializer 112a-b to the data re-timing block 118. Accordingly, the data alignment controller 106 may determine the output delay time for the individual destination modules 104a-b based on the feedback delay provided by the PDU2 122 that aligns the feedback clock signals.

Alternatively, or additionally, the feedback module 114 may determine which feedback clock signal arrives last. The data alignment controller 106 may adjust the feedback delay time of the other destination modules 104a-b until all of the feedback clock signals arrive at approximately the same time as the last feedback clock signal.

In various embodiments, the data alignment controller 106 may program the data re-timing block 118 and/or PDU1 120 to apply the determined output delay time to the high-speed data segment and output the high-speed data segment as the output signal (e.g., OUT1, OUTn). The output signals of all of the destination modules 104a-b may thus be temporally aligned.

In some embodiments, the data re-timing block may include internal delay logic 124 to delay the high-speed data segment by a first delay time equal to an integer multiple of the clock cycle time of the source clock signal, and the PDU1 120 may be used to delay the high-speed data segment by a second delay time equal to a fraction of the clock cycle time. For example, if the output delay time is determined to be 4.3 clock cycles, the internal delay logic 124 may be programmed to delay the high-speed data segment by 4 cycles, while the PDU2 122 may be programmed to delay the high-speed data segment by 0.3 cycles. In some embodiments, the internal delay logic 124 may include one or more flip flops and/or other suitable logic to delay the high-speed data segment. The PDU1 120 may receive the source clock signal and may provide the data re-timing block 118 with a delayed source clock signal with an added delay equal to the second delay time. The data re-timing block 118 may sample (e.g., latch) the data of the high-speed data segment using the source clock signal received from the high-speed clock generator 110. The data re-timing block 118 may then synchronize the sampled data with the delayed source clock signal received from the PDU1 120 and further delay the data with an integer number of clock cycles (as calculated by the Data Alignment Controller 106) using internal delay logic in the re-timing block 118.

Using the internal delay logic to delay the high-speed data segment by an integer-multiple of the clock cycle and the PDU1 122 to delay the high-speed data segment by a fraction of the clock cycle may allow a relatively small PDU1 122 to be used. However, in other embodiments, the PDU1 122 may be used to provide the entire output delay. Additionally, or alternatively, although PDU1 122 is shown as a separate component from the data re-timing block 118, in some embodiments the PDU1 122 may be integrated into the data re-timing block 118 and/or the internal delay logic 124.

Additionally, or alternatively, the scheme described herein may be used to re-time other control signals sent to multiple receiving modules to enable other functionality, such as the start of transfer of data/address/control, at the same time. For example, a control signal may be calibrated in accordance with the scheme described herein to arrive at the plurality of destination modules 104a-b at the same time. The control signal may arrive at the destination modules 104a-b after data has been loaded into the destination modules 104a-b (e.g., after the data segments have been received by the destination modules 104a-b and are ready to be transmitted). The destination modules 104a-b may then release the data segments in response to receiving the control signal. Accordingly, the calibrated control signal may be used to re-time the data segments at the destination modules 104a-b.

In various embodiments, the source module 102, destination modules 104a-b, and data alignment controller 106 may be disposed on a same die. For example, the source module 102, destination modules 104a-b, and data alignment controller 106 may be included in a system-on-chip (SoC). In other embodiments, one or more of the destination modules 104a-b may be external devices (e.g., not disposed on the same die as the source module 102 and/or data alignment controller 106).

In one embodiment, the source module 102 may be included in a memory controller of a computing system. The destination modules 104a-b may be included in respective input/output (I/O) buffers of a memory controller input output (MCIO) module. The data alignment controller 106 may be coupled to the memory controller and/or MCIO module. In some embodiments, the data alignment controller 106 may be included in and/or embodied by a microcontroller. Alternatively, the data alignment controller 106 may be incorporated and/or integrated into the memory controller.

In various embodiments, the system 100 may temporally align the output signals at the destination modules 104a-b in an efficient manner. The system 100 may not allow the use of a high frequency clock signal over long distance wires. The system 100 may not require clock manipulation (e.g., providing an early clock signal at the source and late clock signal at the destination), intermediate sampling (e.g., pipelining), and/or ramps. The system 100 may be used even when the propagation delay of the high-speed data segments exceeds the clock cycle time of the source clock signal. Additionally, the system 100 may reduce cross-chip routing density and allow the timing of the chip to converge at a higher working frequency compared with using a wider and slower (lower clock frequency) data bus.

Figure 2:
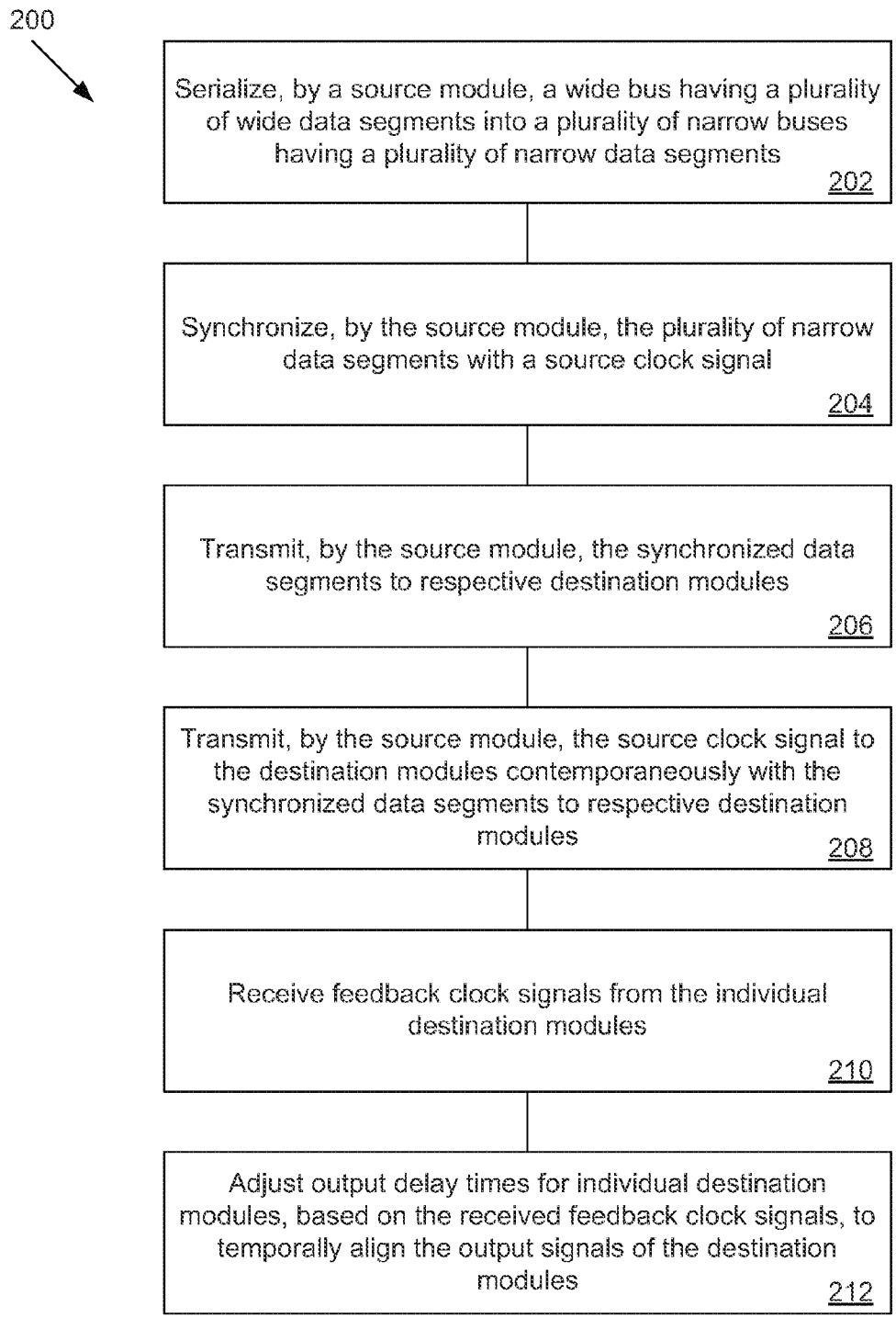
FIG. 2 illustrates a method for high-speed bus synchronization in accordance with various embodiments.

FIG. 2 illustrates a method 200 of high frequency bus synchronization in accordance with various embodiments. At 202, a source module may serialize a wide bus having a plurality of wide data segments into a plurality of narrow buses having a plurality of narrow data segments. At 204, the source module may synchronize the plurality of narrow data segments with a source clock signal to produce high-speed data segments. The high-speed data segments may have a higher frequency than the wide data segments.

At 206, the source module may transmit the synchronized high-speed data segments of a first narrow bus of the plurality of narrow buses to respective destination modules. The destination modules may pass the high-speed data segments as respective output signals, as described herein.

At 208, the source clock signal (e.g., source-synchronous clock) may be transmitted to the destination module contemporaneously with the high-speed data segments. The destination modules may sample the received high-speed data segment using the received source clock signal.

At 210, feedback clock signals may be received from the destination modules. The feedback clock signals may be delayed versions of the source clock signal. The feedback clock signals may be received at different times depending on a propagation delay of the respective destination modules.

At 212, output delay times may be adjusted for the individual destination modules, based on the received feedback clock signals, to temporally align the output signals of the destination modules. For example, a data alignment controller may detect the propagation delay of the individual destination modules by aligning the feedback clock signals as described herein. The data alignment controller may determine the output delay time for the destination module based on the respective propagation delay time. The data alignment controller may program the destination modules with the determined output delay time. The destination modules may delay the received high-speed data segment by the respective output delay time to produce the respective output signal. Accordingly, the output signals of all the destination modules may be temporally aligned.

In various embodiments, the method 200 may be repeated periodically to calibrate the high-speed bus. For example, the data alignment controller may re-initiate the method 200 after a re-calibration time. The propagation delay times of the destination modules may vary based on process, voltage, and/or temperature (PVT) conditions and/or other factors. The periodic calibration may account for changes and/or drift in the propagation delays.

In some embodiments, the calibration of the timing of the feedback clock signals and/or timing of other control signals may be done periodically without sending data on the high speed bus at the same time. That is, the calculation of the determined output delay time and update of the output delay time in the destination modules may be done when there's no traffic on the high speed bus, e.g., to avoid data corruption. Then, data may be sent on the high-speed data bus and delayed at the destination modules by the determined output delay time.

Figure 3:
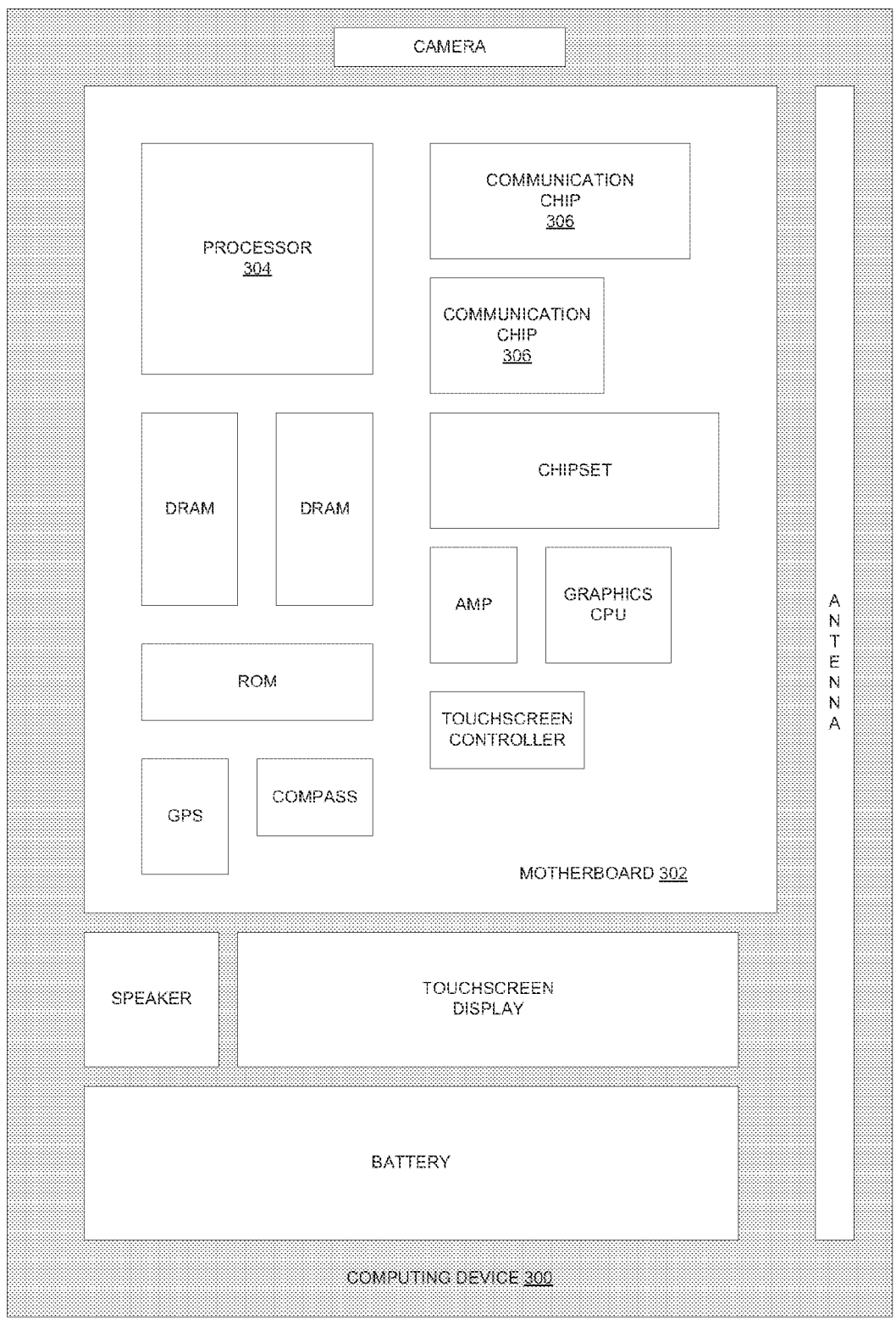
FIG. 3 illustrates an example computing system suitable for practicing the disclosed embodiments.

FIG. 3 illustrates a computing device 300 in accordance with one implementation of the invention. The computing device 300 houses a board 302. The board 302 may include a number of components, including but not limited to a processor 304 and at least one communication chip 306. The processor 304 is physically and electrically coupled to the board 302. In some implementations the at least one communication chip 306 is also physically and electrically coupled to the board 302. In further implementations, the communication chip 306 is part of the processor 304.

Depending on its applications, computing device 300 may include other components that may or may not be physically and electrically coupled to the board 302. These other components may include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, other suitable sensors (e.g., an accelerometer and/or an ambient light sensor (ALS)), a speaker, a camera, and a mass storage device (such as hard disk drive, compact disk (CD), digital versatile disk (DVD), a wireless (RF and/or optical) subsystem, security subsystem, power management system, and so forth).

The communication chip 306 enables wireless communications for the transfer of data to and from the computing device 300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 306 may implement any of a number of wireless standards or protocols, including but not limited to wireless optical communication as described herein, Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. The computing device 300 may include a plurality of communication chips 306. For instance, a first communication chip 306 may be dedicated to shorter range wireless communications such as Wi-Fi and Bluetooth and a second communication chip 306 may be dedicated to longer range wireless communications such as GPS, EDGE, GPRS, CDMA, WiMAX, LTE, Ev-DO, and others.

The processor 304 of the computing device 300 includes an integrated circuit die packaged within the processor 304. In accordance with an implementation of the disclosed embodiments, the integrated circuit die of the processor 304 includes one or more devices, such as transistors or metal interconnects, that are formed in accordance with implementations of the disclosed embodiments. The term "processor" may refer to any device or portion of a device that processes electronic data from registers and/or memory to transform that electronic data into other electronic data that may be stored in registers and/or memory.

The communication chip 306 also includes an integrated circuit die packaged within the communication chip 306. In accordance with an implementation of the disclosed embodiments, the integrated circuit die of the communication chip includes one or more devices, such as transistors or metal interconnects, that are formed in accordance with implementations of the disclosed embodiments. The communication chip 306 may include a photodiode, a laser device, LED or any other similar device for transmitting and/or receiving a wireless optical signal. The chip may be on the motherboard 302 or may be housed in the mirror assembly.

In further implementations, another component housed within the computing device 300 may contain an integrated circuit die that includes one or more devices, such as transistors or metal interconnects, that are formed in accordance with implementations of the invention. For example, the DRAM, ROM, and/or flash memory may include an integrated circuit die that includes one or more devices, such as transistors or metal interconnects, that are formed in accordance with implementations of the invention.

In some embodiments, a source module (e.g., source module 102), a plurality of destination modules (e.g., destination modules 104a-b), and a data alignment controller (e.g., data alignment controller 106) may be included on a same die. In other embodiments, one or more of the components may be disposed on a different die from other components.

In various implementations, the computing device 300 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, a digital video recorder, a data storage device a sensor, an instrument, and/or an appliance. In further implementations, the computing device 300 may be any other electronic device that processes data.

Although various example methods, apparatus, systems, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus, comprising:
   a source module coupled with a plurality of destination modules, the source module configured to:
   synchronize a plurality of data segments with a source clock signal;
   transmit respective synchronized data segments to individual destination modules of the plurality of destination modules, the individual destination modules passing the data segments as respective output signals;
   transmit a source signal to the destination modules contemporaneously with the synchronized data segments; and
   receive feedback signals from the individual destination modules of the plurality of destination modules, the feedback signals being delayed versions of the source signal; and
   a data alignment controller coupled with the source module and the plurality of destination modules, the data alignment controller configured to:
   adjust an output delay time for the individual destination modules, based on the received feedback signals, to temporally align the output signals of the destination modules.

2. The apparatus of claim 1, wherein the source module is further configured to serialize the data segments from a wide data bus synchronized with a first clock signal to a plurality of narrow data buses synchronized with the source clock signal, wherein the source clock signal has a higher frequency than the first clock signal.

3. The apparatus of claim 1, wherein the source module further includes a clock generator to generate the source clock signal.

4. The apparatus of claim 1, wherein the source signal is the source clock signal.

5. The apparatus of claim 4, wherein the individual destination modules include a data re-timing block configured to:
   receive the data segment and the source clock signal from the source module;
   sample the received data segment using the received source clock signal; and
   delay the data segment by the output delay time to produce the output signal.

6. The apparatus of claim 5, wherein the data re-timing block includes delay logic to delay the data segment by a first delay time equal to an integer multiple of a clock cycle of the source clock signal, and wherein the individual destination modules include a first programmable delay unit to delay the data segment by a second delay time equal to a fraction of the clock cycle, wherein a total of the first delay time and the second delay time equals the output delay time.

7. The apparatus of claim 1, wherein the source signal is a source control signal.

8. The apparatus of claim 1, wherein a first propagation delay time for the source signal to travel from the source module to the destination module is substantially equal to a second propagation delay time for the feedback signal to travel from the destination module to the source module.

9. The apparatus of claim 1, wherein the data alignment controller is further configured to:
detect a propagation delay time for the individual destination modules based on the feedback signals; and
adjust the output delay time based on the respective propagation delay time.

10. The apparatus of claim 9, wherein the individual destination modules include a feedback programmable delay unit that delays the feedback signal by a feedback delay time, wherein the data alignment controller determines the propagation delay by adjusting the feedback delay time until the feedback signals of the plurality of destination modules are temporally aligned when received by the source module.

11. The apparatus of claim 1, wherein a relative propagation delay time difference between the data segments and the source signal received by individual destination modules is less than a clock cycle time of the source clock signal.

12. The apparatus of claim 1, wherein the source module, the plurality of destination modules, and the data alignment controller are disposed on a same die.

13. A method, comprising:
serializing, by a source module, a wide bus having a plurality of wide data segments into a plurality of narrow buses having a plurality of narrow data segments;
synchronizing, by the source module, the plurality of narrow data segments with a source clock signal to produce high-speed data segments, the high-speed data segments having a higher frequency than the wide data segments;
transmitting, by the source module, the high-speed data segments of a first narrow bus of the plurality of narrow buses to respective destination modules, the individual destination modules passing the high-speed data segments as respective output signals;
transmitting the source clock signal to the destination modules contemporaneously with the high-speed data segments;
receiving feedback clock signals from the individual destination modules, the feedback clock signals being delayed versions of the source clock signal; and
adjusting output delay times for individual destination modules, based on the received feedback clock signals, to temporally align the output signals of the destination modules.

14. The method of claim 13, further comprising:
detecting a propagation delay for the individual destination modules based on the feedback clock signals, wherein the respective output delay time is adjusted based on the detected propagation delay.

15. The method of claim 14, wherein the detecting the propagation delay includes adjusting a feedback delay time applied to respective feedback clock signals until the feedback clock signals of the plurality of destination modules are temporally aligned when received by the source module.

16. The method of claim 13, further comprising generating the source clock signal.

17. The method of claim 13, further comprising:
receiving, by a first destination module of the plurality of destination modules, a first high-speed data segment of the plurality of data segments and the source clock signal; and
latching the received high-speed data segment using the received source clock signal.

18. The method of claim 17, further comprising:
delaying, by the first destination module, the first high-speed data segment by the respective output delay time to produce the respective output signal.

19. The method of claim 13, wherein a first propagation delay time for the source clock signal to travel from the source module to the destination module is equal to a second propagation delay time for the feedback clock signal to travel from the destination module to the source module.

20. The method of claim 13, wherein a relative propagation delay time difference between the data segments and the source clock signal received by individual destination modules is less than half of a clock cycle time of the source clock signal.

21. A system, comprising:
an input/output (I/O) module having a plurality of I/O buffers;
a memory controller coupled with and disposed on a same die as the I/O module, the memory controller including:
low-speed clock logic to produce a wide bus including a plurality of low-speed data segments;
a plurality of serializers configured to:
convert individual low-speed data segments into a plurality of high-speed data segments synchronized with a source clock signal having a higher frequency than the low-speed data segments; and
transmit the high-speed data segments to a respective I/O buffer;
a clock generator configured to produce the source clock signal and to transmit the source clock signal to the I/O buffers contemporaneously with the respective high-speed data segments; and
a feedback module configured to receive the transmitted source clock signals back from the individual I/O buffers as respective feedback clock signals; and
a data alignment controller coupled with and disposed on the same die as the memory module and the I/O module, the data alignment controller configured to:
detect a propagation delay time for the individual I/O buffers based on the feedback clock signals; and
adjust an output delay time for the individual I/O buffers, based on the propagation delay time, to temporally align output signals of the I/O buffers.

22. The system of claim 21, wherein the individual I/O buffers include a data re-timing block configured to:
receive the high-speed data segment and the source clock signal from the memory module;
sample the received data segment using the received source clock signal;
delay the high-speed data segment by the output delay time to produce the output signal.

23. The system of claim 22, wherein the data re-timing block includes delay logic to delay the high-speed data segment by a first delay time equal to an integer multiple of a clock cycle of the source clock signal, and wherein the individual I/O buffers include a first programmable delay unit to delay the high-speed data segment by a second delay time equal to a fraction of the clock cycle, wherein a total of the first delay time and the second delay time equals the output delay time.

24. The system of claim 23, wherein the individual I/O buffers include a second programmable delay unit that delays the feedback clock signal by a feedback delay time, wherein the data alignment controller determines the propagation delay by adjusting the feedback delay time until the feedback clock signals of the plurality of destination modules are temporally aligned when received by the feedback module.

25. The system of claim 21, wherein a first propagation delay time for the source clock signal to travel from the memory module to the I/O buffer is equal to a second propagation delay time for the feedback clock signal to travel from the I/O buffer to the memory module.

26. The system of claim 21, wherein a relative propagation delay time difference between the high-speed data segments and the source clock signal received by individual I/O buffers is less than half of a clock cycle time of the source clock signal.

* * * * *